(No Model.)  2 Sheets—Sheet 1.

H. F. CHICK.
ANTIINDUCTIVE CONDUCTOR.

No. 513,482. Patented Jan. 30, 1894.

WITNESSES
J. W. Cummings.
M. G. Miller.

INVENTOR
Horace F. Chick
by his attys
Clarke & Raymond (No Model.) 2 Sheets—Sheet 2.

H. F. CHICK.
ANTIINDUCTIVE CONDUCTOR.

No. 513,482. Patented Jan. 30, 1894.

WITNESSES
J. M. Dolan.
J. W. Cummings.

INVENTOR
Horace F. Chick
by his Atty
Clarke & Raymond

UNITED STATES PATENT OFFICE.

HORACE F. CHICK, OF WATERTOWN, ASSIGNOR TO JOHN A. EMERY, TRUSTEE, OF BOSTON, MASSACHUSETTS.

ANTIINDUCTIVE CONDUCTOR.

SPECIFICATION forming part of Letters Patent No. 513,482, dated January 30, 1894.

Application filed May 29, 1893. Serial No. 475,912. (No model.)

*To all whom it may concern:*

Be it known that I, HORACE F. CHICK, a citizen of the United States, and a resident of Watertown, in the county of Middlesex and State of Massachusetts, have invented a new and useful Improvement in Supports and Separators for Metallic Circuits, &c., of which the following is a full, clear, and exact description, reference being had to the accompanying drawings, forming a part of this specification, in explaining its nature.

The invention is in some respects an improvement upon that described in Patent No. 413,707, dated October 29, 1889. The said patent describes a metallic circuit having two branches or wires and a separator of textile material wound about and between said branches throughout the length of the circuit to separate and yet bind said branches, the wires being insulated or not, as desired. The separator is not fastened between its ends to either wire, and in case it becomes broken or parted, there is nothing to prevent its unwinding or becoming detached from both wires to an extent sufficient to permit them to come together. My invention seeks to remedy this objection by securing the separator to one of the wires at each point where it runs over or traverses the same, so that the separator becomes in effect a number of loops, each of which is fastened to one of the wires so that the breaking of one loop will not affect the proper action of the loop immediately next it. I have represented as one method of securing the separator to one of the wires a winding of tape, which is preferably first prepared by being subjected to an adhesive insulating mixture, and which is then wound around the wire, and at the point where the separator crosses it, around the wire and separator, and this acts not only to hold the separator to the wire by the binding action arising from passing around it and the wire but also by the adhesion of the separator to it and the wire, due to the use of an adhesive insulating composition. The tape also acts to additionally insulate the wire upon which it is wound. The two wires may form a metallic circuit or one may act simply as a support for the other, one only being an electric conductor, or as a support for a group of electric conductors, either in cable or other form.

Figure 1:
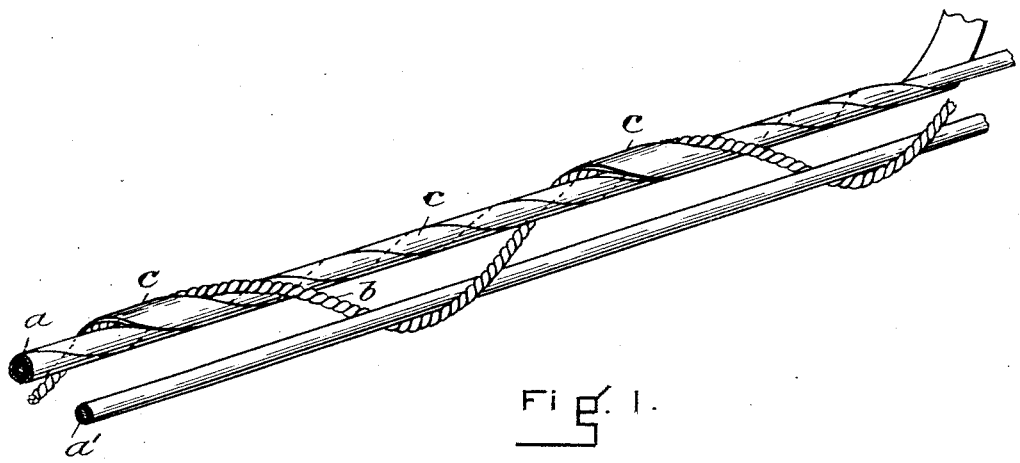
Figure 2:
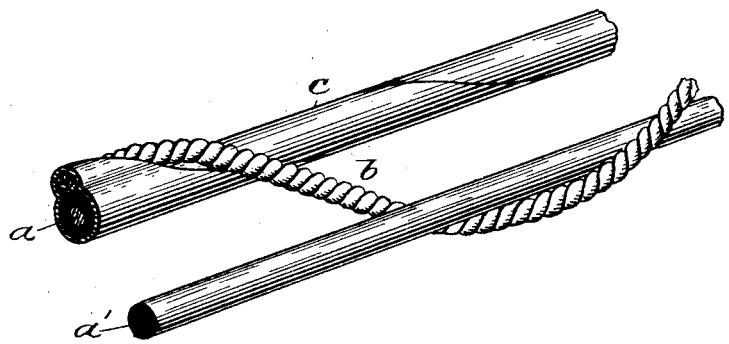
Figure 3:
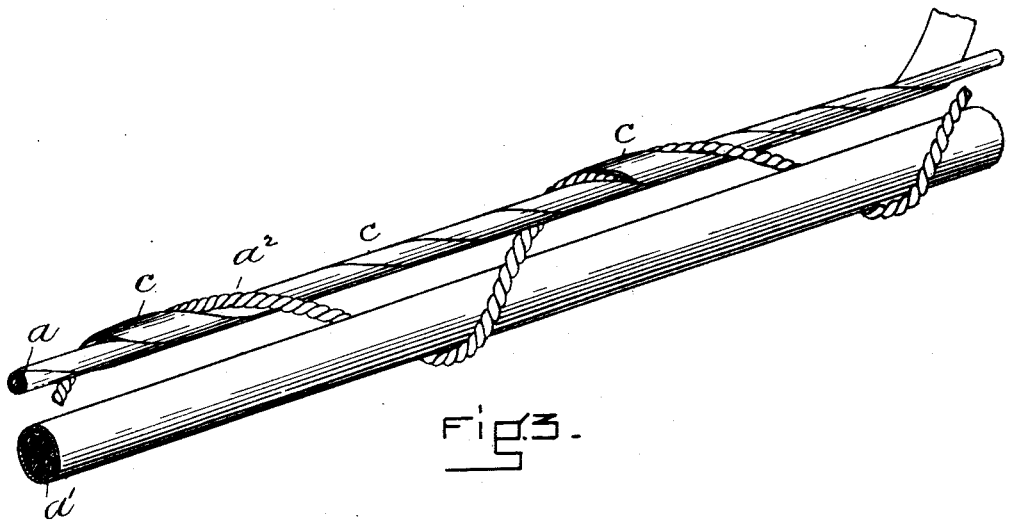
Figure 4:
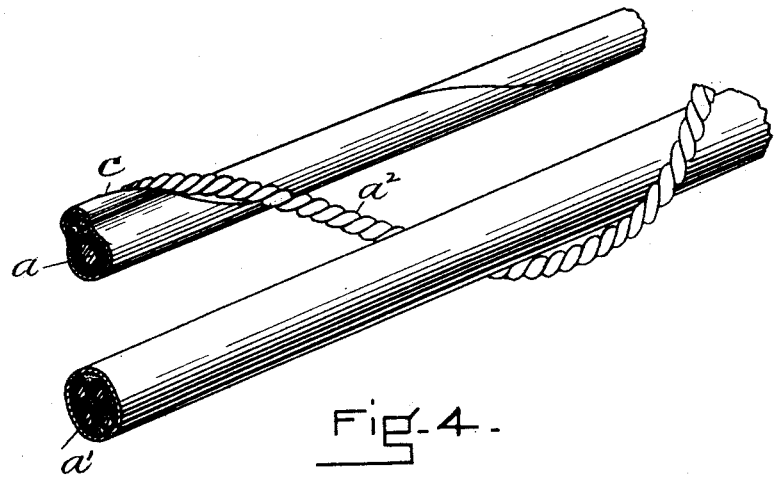

Referring to the drawings: Figure 1 is a view in perspective of my invention. Fig. 2 is a detail view enlarged to better show the construction. Figs. 3 and 4 are views representing the invention as employed in connecting a group of electric conductors with a supporting wire which may or may not form a part of a metallic circuit.

$a$ represents one of the insulated wires which may comprise one of the legs or sections of a metallic circuit, and $a'$ represents the other insulated wire which may form the other leg or section of a metallic circuit; the same letter $a'$ also represents a group or series of electric conductors insulated from each other and arranged in cable or other form.

$b$ is the separator. It is of textile material and is wound about and between the two wires, throughout the length of the circuit, as represented in Figs. 1 and 2, or between a single wire and the group of wires, as represented in Fig. 3, and it is secured to one of the wires at the points where it crosses over said wire by means of a tape $c$, which is prepared for use by being saturated with an insulating adhesive composition, and which is then wound spirally about said wire and about the wire and separator, at the points where they are in contact, and thus acts not only to additionally insulate the wire upon which it is wound, but also to unite the separator at the contact points with the wire, by binding or tying it to the wire, and by sticking it or causing it to adhere to the insulated covering of the wire, and to the tape. This makes the separator consist of a number of loops, which, although they are connected, in that they are formed from a single piece or length of textile or fibrous material, are still separated from each other, in that they have independent fastening connections with one of the wires at the points where they join said wire, so that the wearing or breaking away of one of the loops will not in any way affect the separating and holding action of the next loops in order, the next loops being held to one of the wires by their independent fastenings, and in this respect, I would say, that I do not confine myself to the particular means of fastening the separator to one of the wires at the points where it is in contact with said wire, to the particular device herein described, but may use any equivalent means for accomplishing the same purpose, namely, for uniting one of the rolls to the separator at the points where they combine or intersect.

It will be observed that the separator does not act to bind two insulated wires closely together, but on the contrary, while serving as a support for one of the wires, permits such wire by gravity to occupy a position somewhat removed from the other wire. I prefer that there be a space of from one half to three-fourths of an inch between the two wires, as such space cannot be readily bridged by rain or water and the danger of short circuiting from such cause is avoided.

What I have above said applies to the construction represented in Fig. 3, where the single wire is not necessarily a leg or section of a metallic circuit, but simply a supporting device.

Having thus fully described my invention, I claim and desire to secure by Letters Patent of the United States—

1. The combination with a metallic circuit composed of two branches or wires of a separator of textile material wound about and between said branches or wires throughout the length of the circuit to separate and yet bind them, and which separator is attached to one of the wires at the points where it crosses or intersects the same, as and for the purposes described.

2. The combination with a metallic circuit composed of two insulated branches or wires of a separator of textile or fibrous material wound about and between the said branches or wires throughout the length of the circuit, to separate and yet bind them, and a wrapping of adhesive insulating tape wound about one of the wires and the separator where it crosses said wire to unite the separator at said points to the wire, as and for the purposes described.

3. The combination with a metallic circuit composed of two insulated branches or wires of a separator of textile or fibrous material wound about and between said branches or wires throughout the length of the circuit to separate and yet bind them and a tape of fibrous material saturated or coated with an adhesive and insulating substance wound about one of the insulated wires throughout its length, and also about the separator where it is in contact with or crosses said wire, as and for the purposes described.

4. The combination of an insulated wire with a second insulated wire or group of wires suspended from the first named wire by a fibrous holding of suspending cord which is passed over the supporting wire and between it and the other wire or group of wires at convenient distances, and which is united to one of the wires or to the group at the points of contact therewith, as and for the purposes described.

HORACE F. CHICK.

Witnesses:
F. F. RAYMOND, 2d
M. GERTRUDE MILLER.